United States Patent
Ayala et al.

(10) Patent No.: US 6,466,798 B1
(45) Date of Patent: *Oct. 15, 2002

(54) SYSTEM AND METHOD FOR AUTOMATICALLY DISTRIBUTING COMMUNICATIONS TO SELECTED LOCATIONS

(75) Inventors: Rajasekhar Ayala, Louisville; Mark Sheldon Blumhardt, Niwor, both of CO (US)

(73) Assignee: Qwest Communications International Inc., Denver, CO (US)

( * ) Notice: Subject to any disclaimer, the term of this patent is extended or adjusted under 35 U.S.C. 154(b) by 49 days.

This patent is subject to a terminal disclaimer.

(21) Appl. No.: 09/689,372

(22) Filed: Oct. 12, 2000

Related U.S. Application Data

(63) Continuation of application No. 08/088,708, filed on Jul. 8, 1993, now Pat. No. 6,169,904.

(51) Int. Cl.$^7$ .................................................. H04Q 7/20
(52) U.S. Cl. .................. 455/461; 455/445; 379/211.02; 379/265.02
(58) Field of Search ................................. 455/413, 414, 455/417, 445, 461, 459, 558; 379/67.1, 200, 211.02, 214.01, 221.08, 221.09, 265.03, 265.04, 265.11, 265.02

(56) References Cited

U.S. PATENT DOCUMENTS

| | | |
|---|---|---|
| 3,737,587 A | 6/1973 | Romero |
| 4,680,785 A | 7/1987 | Akiyama et al. |
| 4,763,353 A | 8/1988 | Canale et al. |
| 4,893,328 A | 1/1990 | Peacock |
| 4,893,335 A | 1/1990 | Fuller et al. |
| 4,893,336 A | 1/1990 | Wuthnow |
| 4,951,310 A | 8/1990 | Honda et al. |
| 5,036,535 A | 7/1991 | Gechter et al. |
| 5,151,929 A | 9/1992 | Wolf |
| 5,168,515 A | 12/1992 | Gechter et al. |
| 5,247,571 A | 9/1993 | Kay et al. |
| 5,260,986 A | 11/1993 | Pershen |
| 5,329,578 A | 7/1994 | Brennan et al. |
| 5,353,331 A | 10/1994 | Emery et al. |
| 5,377,186 A | 12/1994 | Wegner |
| 6,169,904 B1 * | 1/2001 | Ayala et al. ................ 455/461 |

OTHER PUBLICATIONS

Biana Coker "Personal Communications Services: An application of Wireless Access Technology and the Intelligent Network" Telephony, Dec. 1991.

M. Ballard et al. "Cellular Mobile Radio As An Intelligent Network Application" Electrical Communication. vol. 63, #4, 1989.

"Newton's Telecom Dictionary", 8$^{th}$ ed., Harry Newton, p. 106.

Operations Issues for Advanced Intelligent Networks David Pezzutti. IEEE Communications, p. 58–63 (Feb. 1992).

Perspectives on the AIN Architecture, Berman et al., IEEE Communications, p. 27–32 (Feb. 1992).

* cited by examiner

Primary Examiner—Nay Maung
(74) Attorney, Agent, or Firm—Brooks & Kushman P.C.

(57) ABSTRACT

A system and method for automatically distributing communications to selected locations includes switching means which is provided in electrical communication with a calling party's CPE device and a plurality of secondary parties' CPE devices. As disclosed, the system may be adapted for use in both advanced intelligent networks (AIN) and non-AIN arrangements. Similarly, the switching means may be provisioned with automatic call distribution (ACD) architecture or, in specified AIN arrangements, with a Service Node or advanced functionality controlled by a properly interfaced service control point (SCP) or adjunct. In operation, the switching means parks incoming communication on queue while performing selected routing functions in an attempt to locate the secondary party if one of the plurality of selected communication addresses. In the preferred embodiment, the selected routing functions are performed in a predetermined sequence.

10 Claims, 3 Drawing Sheets

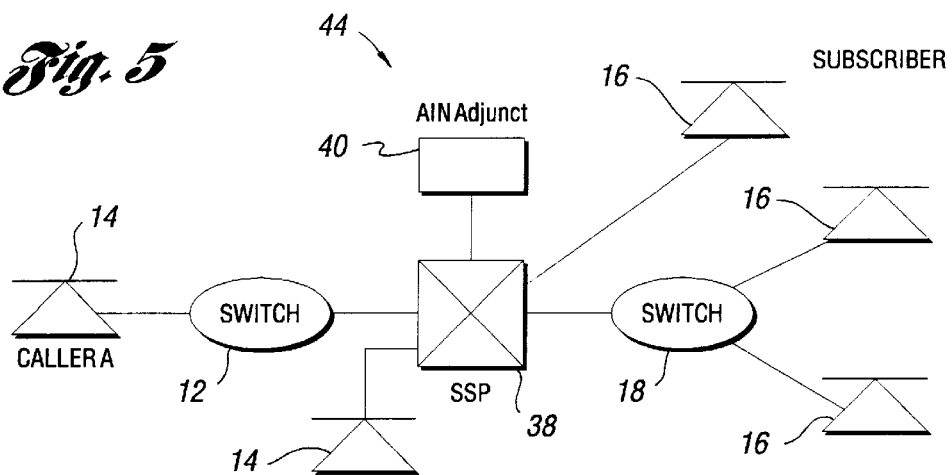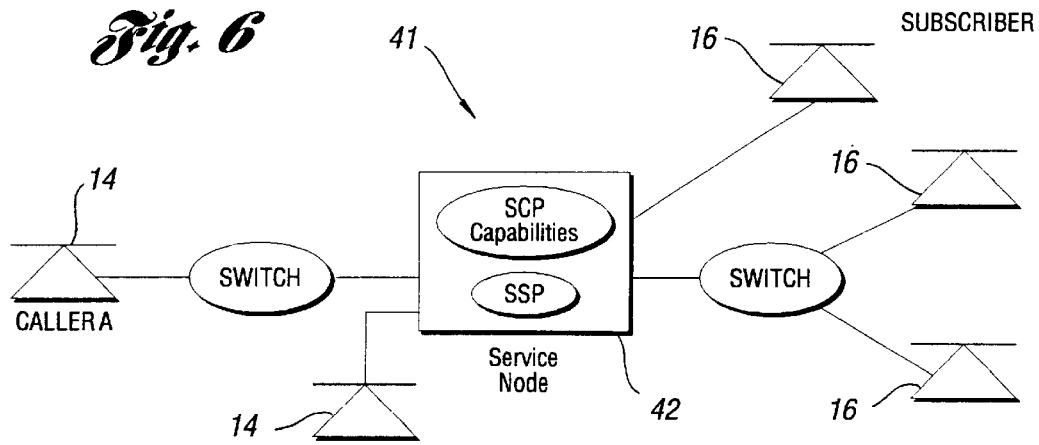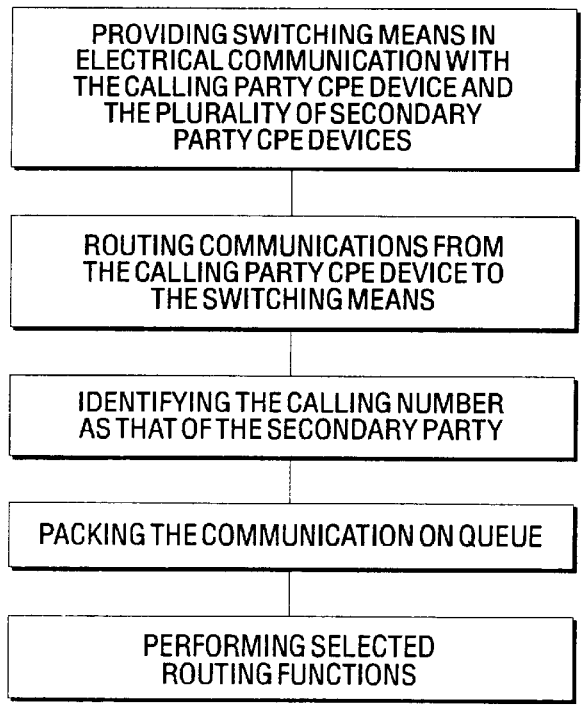

SYSTEM AND METHOD FOR AUTOMATICALLY DISTRIBUTING COMMUNICATIONS TO SELECTED LOCATIONS

This is a continuation of application Ser. No. 08/088,708, filed on Jul. 8, 1993 and issued as U.S. Pat. No. 6,169,904 on Jan. 2, 2001.

TECHNICAL FIELD

This invention relates generally to communication networks and, more particularly, to a system for automatically routing communications to a subscribing party having a single calling number for a plurality of Customer Premises Equipment (CPE) devices placed at different geographic locations and having corresponding communication addresses.

BACKGROUND ART

As communication technology has advanced, the use of multiple Customer Premises Equipment (CPE) devices has increased accordingly. Indeed, it is now common for even a small business to have numerous CPE devices such as telephones and facsimile machines, each of which must be addressed by a unique calling number, internal exchange number, and corresponding communication address. As those skilled in the art will recognize, a common problem for such users occurs when a communication such as a telephone call, for example, is sought to be connected to an intended recipient who is not at his or her normal or customary office or station, yet available to receive or be notified of the communication at an alternative destination. Under such circumstances, the recipient will ordinarily miss the communication. Alternatively, offices equipped with Public Address (PA) or other paging systems may manually announce the incoming communication along with identifying information regarding the position where the incoming communication has been placed. In telephone communications, for example, an operator manually paging Ms. Jones with a telephone call from Mr. Smith which has been stored on line 58 may announce "Mr. Smith, Ms. Jones on 58." Still further, where Voice Messaging Systems (VMS) have been implemented, the call may be forwarded to a specified voice mailbox where the caller will receive a pre-recorded message intended for any caller.

As readily seen, regardless of the conventional routing alternative utilized, the general result is the same. The caller must be placed on hold for indefinite periods of time and in most instances will likely receive an impersonal message at best. At the same time, the exchange operator must juggle numerous calls in an effort to take written messages, page intended recipients, direct calls to voice mailboxes, where available, and respond to impatient and often disgruntled callers. Such activity is wasteful of time and resources which could more properly be spent by the exchange operator answering incoming calls or responding to customer inquiries. Moreover, in the event that a call cannot be completed because the intended recipient cannot be located, the desired action cannot be taken which may result in substantial economic loss to the recipient as well as his or her business.

One attempt to address the difficulties encountered in such situations is disclosed in U.S. Pat. No. 4,893,328 issued to Peacock for an automated telephone operator overflow device. As disclosed therein, the automated telephone answering device measures the service level being routed by the human operator, and when that service level exceeds a parameter which indicates that the human operator is overloaded and cannot properly service further incoming calls, an automatic routing device is enabled to route selected incoming calls to their destinations. The automatic routing device receives incoming codes from an incoming caller and processes the code to specify a destination.

Similarly, U.S. Pat. No. 5,036,535 issued to Gechter, et al discloses a switchless automatic call distribution system for automatically distributing telephone calls placed over a network to a plurality of agent stations. As disclosed, the stations are connected to the network via network service interfaces and provide agent status messages to the network. The system further includes receiving means connected by means of a network service interface to the network for receiving the agent status messages and a call arrival message from the network indicating that an incoming call has been made on the network. Further, the system discloses routing means responsive to the receiving means for generating a routing signal provided to the network to connect the incoming call to an agent station to the network.

Significantly, the routing invention of the '535 patent is based on status signals received from the agent stations or, in the alternative, characteristics of the agent stations or the incoming calls. Based upon this information, calls are directed to selected agent stations. See, also, U.S. Pat. No. 5,168,515 issued to Geghter, et al, which is a division of the '535 patent, which similarly discloses an automatic call distribution system for distributing calls to a plurality of agent stations.

As is readily seen, the prior art discloses systems for automatically distributing telephone calls to a plurality of different agent stations which, through status messages indicate the capability to receive an incoming call. The prior art does not, however, disclose means for forwarding communications to a single user at a plurality of predetermined yet different geographically located agent stations.

DISCLOSURE OF THE INVENTION

It is an object of the present invention to overcome the limitations of the prior art by providing a communication routing system for directing communications from a calling party having a Customer Premises Equipment (CPE) device to a secondary party having a single calling number for a plurality of CPE devices.

A more specific object of the present invention is the provision of a communication routing system for automatically routing communications from a calling party having a CPE device to a secondary party having a single calling number for a plurality of CPE devices, each of which is placed at different geographic location and has a corresponding communication address.

Yet another object of the present invention is the provision of a method of automatically routing communications from a calling party CPE device to a secondary party having a single calling number for a plurality of CPE devices.

Another more specific object of the present invention is the provision of a method of automatically routing communications from a calling party CPE device to a secondary party having a single calling number for a plurality of CPE devices, each of which is placed at different geographic location and has a corresponding communication address.

In carrying out the above objects, there is provided a system for automatically routing communications which includes switching means which is further provided in electrical communication with the calling party CPE device and the plurality of secondary party CPE devices. As disclosed herein, the system may be adapted for use in both Advanced Intelligent Networks (AIN) and non-AIN arrangements. Similarly, the switching means may be provisioned with Automatic Call Distribution (ACD) architecture or, in specified AIN arrangements, with a service Node or advanced functionality controlled by a properly interfaced Service Control Point (SCP) or adjunct. Whether or not ACD is provided, the goal of the system remains the same, i.e. to park the incoming communication on queue while performing selected routing functions in an attempt to locate the secondary party at one of a plurality of selected communication addresses. As discussed herein, in the preferred embodiment, these selected routing functions are performed in a predetermined sequence.

In an alternative embodiment, there is further provided means for notifying an intended recipient of an incoming communication through the use of a paging system or the like. Again, the paging system may be adapted for use in both Advanced Intelligent Networks (AIN) as well as non-AIN arrangements and may incorporate, for example, a manually operated or digitized Public Address (PA) system as well as wireless pagers or "beepers".

Still further, in yet another alternative embodiment, the communication system may include paging means which requires a specified log-in number unique to the intended recipient before the communication may be completed. As disclosed herein, the log-in number may be entered from any CPE device whether connected via land-line or wireless communication network.

In keeping with the invention, the method steps disclosed herein include the initial provision of switching means which, as referenced above, may be adapted for use in an advanced intelligent network and may similarly be provisioned with Automatic Call Distribution (ACD) architecture in electrical communication with the calling party CPE device and the plurality of secondary party CPE devices. Once a communication is initiated, such as a telephone call, for example, the communication is routed from the calling party CPE device to the switching means wherein the called number is identified as that of a subscribing secondary party. Once identified, the communication is directed to the switching means where it is parked on queue while selected routing functions are performed in an attempt to locate the subscribing secondary party at one of the communication addresses. Again, in the preferred embodiment, the routing functions are performed in a predetermined sequence. In addition to or alternative to these routing functions, the system may further be designed to include means for notifying the intended recipient of an incoming call through the use of a paging system such as a public address (PA) system, wireless beeper or the like. Once notified of the incoming communication whether by page or conventional means, the subscriber may thereafter retrieve the communication. Where applicable, the subscriber may also be required to enter a predetermined log-in number unique to the intended recipient to complete the communication.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIG. 5 is yet another alternative embodiment of the communication routing system of the present invention shown adapted for use in an Advanced Intelligent Network and provisioned with an AIN adjunct;

FIG. 6 is yet another alternative embodiment of the communication routing system of the present invention shown adapted for use in an Advanced Intelligent Network and provisioned with a Release 1 Service Node; and FIG. 7 is a block diagram of the method steps of the present invention.

BEST MODES FOR CARRYING OUT THE INVENTION

Figure 1:
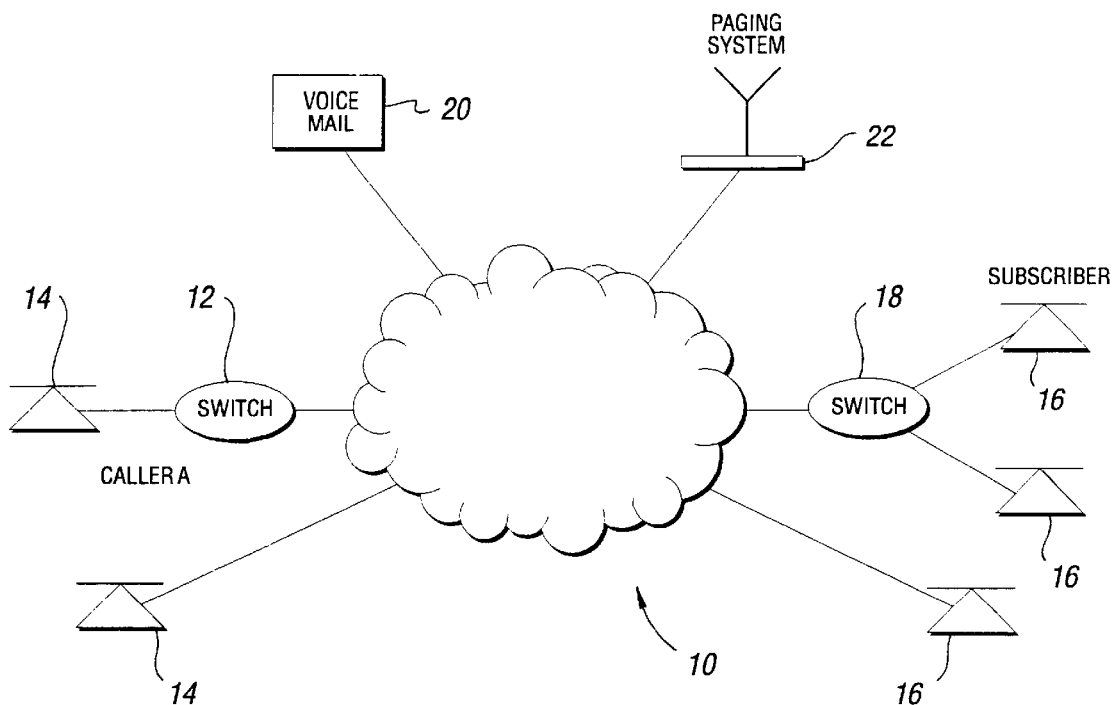
FIG. 1 is a general schematic diagram of the structure of the communications routing system of the present invention.

With reference to FIG. 1 of the drawings, there is provided a general schematic diagram of the structure of the communications routing system of the present invention designated generally by reference numeral 10. System 10 is shown provided in electrical communication with at least one central office switch 12 which, in turn, is provided in electrical communication with the calling party CPE device such as telephone 14. The routing system of the present invention is further shown in electrical communication with a plurality of secondary party CPE devices such as telephones 16 shown positioned at geographically distinct locations. Telephone 16 may, in turn, be provided in electrical communication with a central office switch 18. However, it is contemplated that subscribing secondary party CPE devices 16 as well as calling party CPE device 14 may be provided in direct electrical communication with the communications routing system of the present invention. As further shown in FIG. 1, the present invention also contemplates the use of a voice mail system 20 and a paging system 22 as shown in more detail in the preferred embodiments discussed herein.

Figure 2:
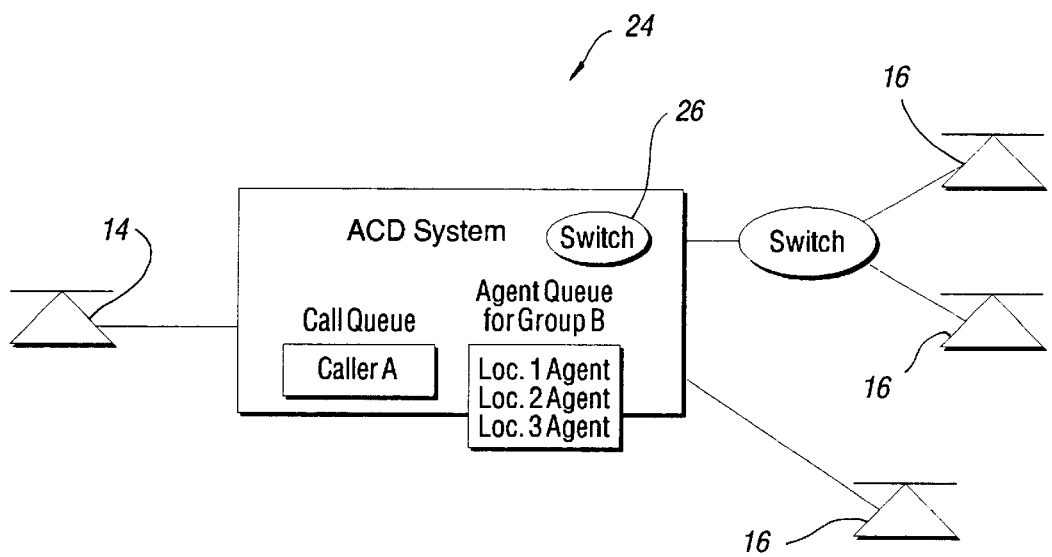
FIG. 2 is a schematic diagram of one embodiment of the communications routing system of the present invention.

Turning now to FIG. 2 of the drawings, there is provided a simplified schematic diagram of one embodiment of the communications routing system of the present invention designated generally by reference numeral 24. As shown, embodiment 24 includes switching means such as central office switch 26 which is provided in electrical communication with the calling party CPE device 14 and a plurality of secondary party CPE devices 16 which, as referenced above, are positioned at geographically distinct locations for routing selected communications. Switching means 26 is further shown provisioned with Automatic Call Distribution (ACD) architecture such that communications may be parked on queue in the ACD while the ACD performs selected routing functions in an attempt to locate the secondary party at one of the corresponding communication addresses of secondary party CPE devices 16. Significantly, in the preferred embodiment, these location sequencing functions are performed in a predetermined sequence in an effort to locate the secondary party at preselected locations.

Figure 3:
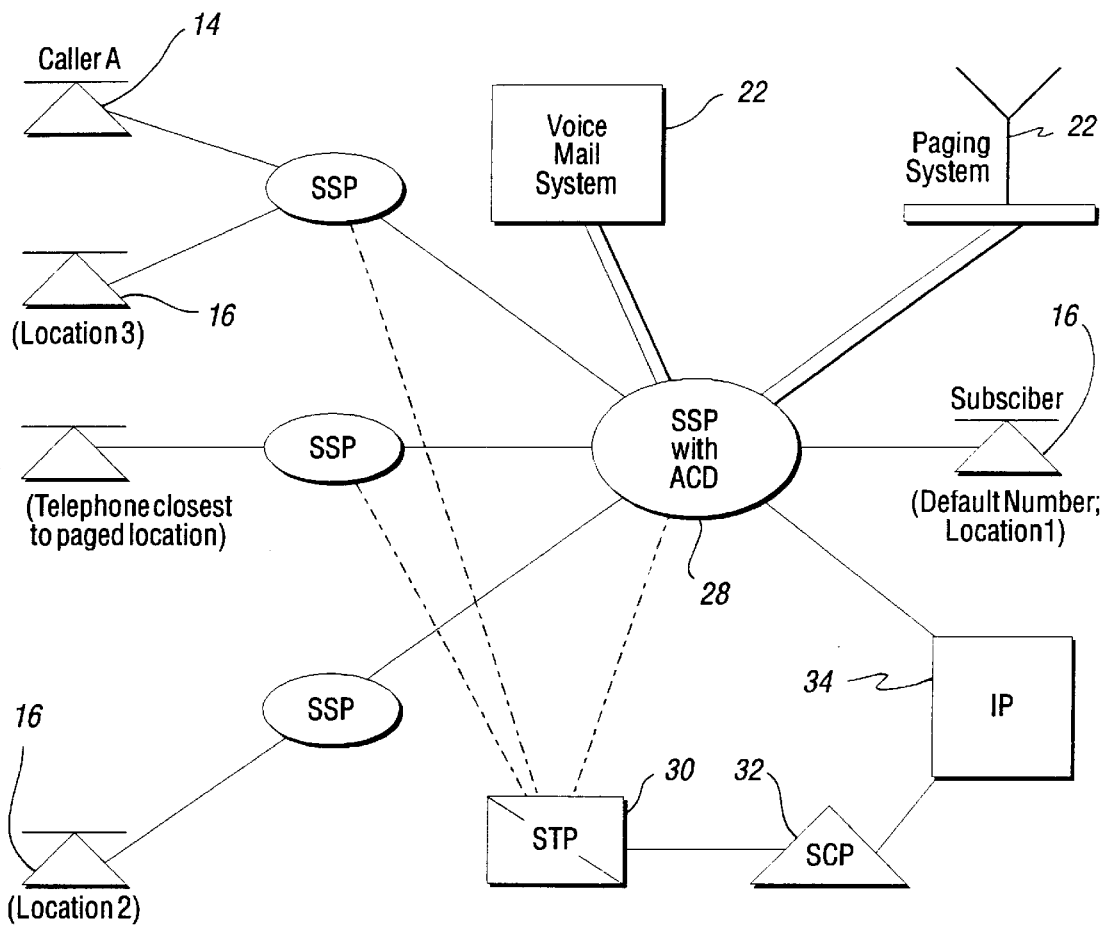
FIG. 3 is a schematic diagram of an alternative embodiment of the communication routing system of the present invention shown adapted for use in an Advanced Intelligent Network (AIN) and provisioned with Automatic Call Distribution (ACD) architecture.

With reference to FIGS. 2, 3 and 7, the operation of the above described embodiment of the communications routing system of the present invention may be described in further detail for use in telephone communications. As seen, both the calling party and secondary party CPE devices 14 and 16, respectively, are thus designated as telephones. In operation, a calling party (caller A) may originate a call from calling party CPE device 14 which is routed to switching means 26. Upon receipt, the called number is identified as corresponding to a subscribing secondary party CPE device and internally routed to the Automatic Call Distribution (ACD) architecture of the switch 26. Once received, the call will thereafter be temporarily placed on queue pending pick-up by the agent group of B, i.e. the intended secondary party who may be at one of the several previously identified locations as shown in FIG. 1. It is to be understood that when the ACD architecture is set-up, a secondary party location sequencing profile will be programmed in accordance with the secondary party's selections such that routing functions may be initiated once the communication is placed on queue. The ACD then contacts the selected telephones 16 placed at the locations in a predetermined succession until the secondary party (agent) picks-up the telephone handset and completes the telephone call.

As referenced above, in an alternative embodiment, the communications routing system of the present invention may be adapted for use in an Advanced Intelligent Network (AIN) and may further include a switch provisioned with Automatic Call Distribution (ACD) architecture. Such an implementation is shown in further detail in FIG. 3. Like the simplified system ot FIG. 2, the AIN system of FIG. 3 also includes switching means such as Service Switching Point (SSP) 28 which is operative to recognize the "triggers" used when a subscriber invokes an intelligent network service and then communicates with one or more Service Control Points (SCP's) which contain the service logic and associated data support to execute the required customer services. As previously indicated, in the embodiment described in FIG. 3, switching means 28 is further provisioned with Automatic Call Distribution (ACD) architecture and is shown in electrical communication with at least one calling party CPE device 14 and a plurality of secondary party CPE devices 16. Secondary party CPE devices 16 are each positioned in a different geographic location and have a corresponding communication address.

Still referring to FIG. 3, as shown, the system further includes a Signal Transfer Point (STP) 30 in electrical communication with switching means 28. As those skilled in the art will recognize, Signal Transfer Points are generally packet switches used to route signalling messages within an Advanced Intelligent Network (AIN). Still further, there is provided Service Control Point (SCP) 32 in electrical communication with STP 30 and an Intelligent Peripheral (IP) 34 which is provided in electrical communication with SCP 32 and switching means 28. As referenced above, there may also be provided a paging system 22 and a voice mail system 20, both of which are provided in electrical communication with switching means 28.

In operation, a calling party may originate a call from a calling party CPE device 14 which will be routed to switching means (SSP) 28 in similar fashion to the embodiment of FIG. 2. Upon receipt, the called number will be identified as corresponding to a subscribing secondary party and internally routed to the ACD portion of switching means 28 after routing instructions are sought from SCP 32. In all cases, the call will be placed on queue in the ACD while the ACD routes the call through a predetermined sequence of alternative destinations until the intended recipient, i.e. the subscribing party, is contacted. As shown, an Intelligent Peripheral (IP) 34 may also be provided to notify the subscriber of an incoming communication at a specified address. IP 34 will, of course, work in cooperation with paging system 22 to notify the secondary party of the incoming call through the use of a Public Address (PA) system, wireless communication, or other suitable paging means. Significantly, it should be noted that in the present invention the IP 34 has no knowledge of the incoming communication. It is designed to merely receive instructions from the SCP 32 to page a secondary party.

As referenced above, the communications routing system of the present invention may also be designed for use in an Advanced Intelligent Network (AIN) which, although not necessarily provisioned for Automatic Call Distribution, may incorporate switching means having advanced functionality to perform similar location sequencing operations. This alternative embodiment of the present invention may be described in further detail with reference to FIG. 4.

Figure 4:
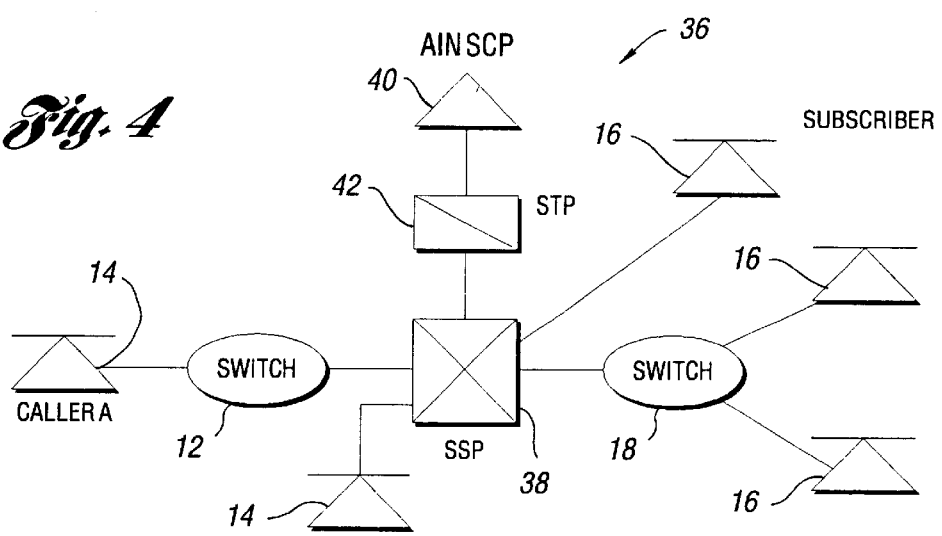
FIG. 4 is an alternative embodiment of the communication routing system of the present invention shown adapted for use in an Advanced Intelligent Network and provisioned with switching means having advanced functionality.

As shown in FIG. 4, the communications routing system of this alternative embodiment is designated generally by reference numeral 36 and includes switching means 38 which, in the preferred embodiment, is an Ericsson Release 1.0 Service Switching Point (SSP) which is provided in electrical communication with at least one calling party CPE device 14 and a plurality of secondary party CPE devices 16. As in the case of the embodiments of FIGS. 2 and 3, secondary party CPE devices 16 are again provided in geographically distinct locations and have corresponding communication addresses. In contrast to the embodiments of FIGS. 2 and 3, however, switching means (SSP) 38 does not necessarily include ACD architecture. The release 1.0 implementation incorporates advanced functionality which may be controlled by a properly interfaced Release 1.0 Ericsson Service Control Point (SCP) 40. As shown, SCP 40 is provided in electrical communication with Signal Transfer Point 42 which, in turn, is provided in electrical communication with SSP 38 for routing signalling messages within the network. As those skilled in the art will recognize, SCP 40 contains the service logic and associated data support to execute the required location sequencing prescribed by the present invention.

In contrast to the embodiment of FIG. 3, however, SCP 40 maintains complete control of the call from beginning to end to achieve the desired functions. In operation, a calling party may therefore originate a call from calling party CPE device 14 which is routed to switching means 38. Upon receipt, the call is again identified as corresponding to a subscribing secondary party and control of the entire call is performed by SCP 40 which, by design, performs the selected location sequencing in an effort to locate the desired secondary party.

Referring now to FIG. 5, another alternative embodiment of the communications routing system of the present invention is shown designated generally by reference numeral 44. Like the embodiment of FIG. 4, this embodiment also includes switching means 38 which, in the preferred embodiment, is an Ericsson release 1.0 Service Switching Point (SSP). SSP 38 is provided in electrical communication with at least one calling party CPE device 14 and a plurality of secondary party CPE devices 16 which are positioned at geographically distinct locations. Also, like the embodiment of FIG. 4, calling party CPE devices 14 and secondary party CPE devices 16 may be provided in direct electrical communication with SSP 38 or may be routed through respective central office switches 12 and 18. In contrast to the embodiment of FIG. 4, however, SSP 38 is shown provided in electrical communication with an AIN adjunct 40 which, as those skilled in the art will recognize, has a different interface than an SCP and generally operates at a much higher speed than the Signalling System No. 7 (SS7) network in which SCPs operate. The interface of AIN adjuncts of the type referenced herein may include direct wiring or, preferably, may utilize fiberoptic technology.

In further contrast to the embodiments of FIGS. 4 and 5, there is shown in FIG. 6 yet another alternative embodiment of the communications routing system of the present invention designated generally by reference numeral 41. Embodiment 41 utilizes an AIN Release 1 Service Node 42 which those skilled in the art will recognize are presently in the prototype stage. Service Node 42 is provisioned with both SSP and SCP capability and has no external links therebetween. As shown in FIG. 6, service node 42 is provided in electrical communication with at least one calling party CPE device 14 and a plurality of secondary party CPE devices 16 which are positioned at geographically distinct locations. Applicants recognize that each of the embodiments of FIGS. 4, 5 and 6, like the embodiments of FIGS. 2–3, may also be provisioned with voice mail systems and paging systems as shown in FIG. 1.

Significantly, each of the embodiments referenced in FIGS. 1–6 above may further include an Anywhere Call Pick-up (ACP) service which may incorporate means for entering a predetermined log-in number unique to the secondary party. In operation, upon notification of an incoming communication, the secondary party would be required to enter the log-in number in order to receive the communication. As readily seen, the use of such a log-in number is a viable alternative to the placing of telephone calls on selected lines. Moreover, such a verification process would eliminate misdirected and inadvertently retrieved communications.

While the best modes for carrying out the invention have been described in detail, those familiar with the art to which this invention relates will recognize various alternative designs and embodiments for practicing the invention as defined by the following claims.

What is claimed is:

1. For use in an Advanced Intelligent Network (AIN), a system for automatically routing communications from a calling party having a Customer Premises Equipment (CPE) device to a secondary party having a single calling number for a plurality of CPE devices, each of said secondary party CPE devices placed at a different geographic location and having a corresponding communication address, the system comprising:
   an AIN Release 1 Service Switching Point (SSP) in electrical communication with said calling party CPE device and said plurality of secondary party CPE devices, and having Automatic Call Distribution architecture;
   a Signal transfer Point (STP) in electrical communication with said SSP; and
   an AIN Release 1 Service Control Point (SCP) in electrical communication with said STP, said SCP adapted to retain complete control of the routing of said communication and perform selected routing functions in a predetermined sequence in an attempt to locate said secondary party at one of said communication addresses, and to direct said SSP how to terminate said communication.

2. A system as in claim 1, further including a voice mail system in electrical communication with said SSP.

3. A system as in claim 1, further comprising Log-in means in electrical communication with said SSP for initiating a Log-in Number unique to said secondary party such that said secondary party may receive said communication from any subscribing CPE device.

4. For use in an Advance Intelligent Network (AIN), a system for automatically routing communications from a calling party having a Customer Premises Equipment (CPE) device to a secondary party having a single calling number for a plurality of CPE devices, each of said secondary party CPE devices placed at a different geographic location and having a corresponding communication address, the system comprising:
   an AIN Release 1 Service Switching Point (SSP) in electrical communication with said calling party CPE device and said plurality of secondary party CPE devices, and having Automatic Call Distribution architecture; and
   an AIN adjunct processor in electrical communication with said SSP, said adjunct processor adapted to retain complete control of the routing of said communication and perform selected routing functions in a predetermined sequence in an attempt to locate said secondary party at one of said communication addresses, and to direct said SSP how to terminate said communication.

5. For use in an Advanced Intelligent Network (AIN), a system for automatically routing communications from a calling party having a Customer Premises Equipment (CPE) device to a secondary party having a single calling number for a plurality of CPE devices, each of said secondary party CPE devices placed at a different geographic location and having a corresponding communication address, the system comprising:
   an AIN release one service node in electrical communication with said calling party CPE device and said plurality of secondary party CPE devices, said service node having Automatic Call Distribution architecture and adapted to retain complete control of said communication and perform selected routed functions in a predetermined sequence in an attempt to locate said secondary party at one of said communication addresses.

6. For use in an Advanced Intelligent Network (AIN), a method of automatically routing communications from a calling party having a Customer Premises Equipment (CPE) device to a secondary party having a single called number for a plurality of CPE devices, each of said secondary party CPE devices placed at a different geographic location and having a corresponding communication address, comprising:
   providing a Release 1 Service Switching Point (SSP) in electrical communication with said calling party CPE device and said plurality of secondary party CPE devices, said SSP having Automatic Call Distribution architecture;
   providing a Signal Transfer Point (STP) in electrical communication with said SSP;
   providing a Release 1 Service Control Point in electrical communication with said STP;
   routing said communication signals from said calling party CPE device to said SSP;
   identifying said called number as that of said secondary party;
   transferring control of routing said communication to said SCP; and
   performing selected routing functions in a predetermined sequence in an attempt to locate said secondary party at one of said communication addresses, and instruct said SSP how to terminate said communication.

7. The method of claim 6, further comprising the step of paging said secondary party.

8. The method of claim 6, further comprising the step of initiating a Log-in Number unique to said secondary party from any CPE device so as to receive said communication.

9. For use in an Advanced Intelligent Network (AIN), a method of automatically routing communications from a calling party having a Customer Premises Equipment (CPE) device to a secondary party having a single called number for a plurality of CPE devices, each of said secondary party CPE devices placed at a different geographic location and having a corresponding communication address, comprising:

- providing a Release 1 Service Switching Point (SSP) in electrical communication with said calling party CPE device and said plurality of secondary party CPE devices, said SSP having Automatic Call Distribution architecture;
- providing an AIN adjunct processor in electrical communication with said SSP;
- routing said communication signals from said calling party CPE device to said SSP;
- identifying said called number as that of said secondary party;
- transferring control of routing said communication to said adjunct processor; and
- performing selected routing functions in a predetermined sequence in an attempt to locate said secondary party at one of said communication addresses, and instruct said SSP where to direct said communication.

10. For use in an Advanced Intelligent Network (AIN), a method of automatically routing communications from a calling party having a Customer Premises Equipment (CPE) device to a secondary party having a single called number for a plurality of CPE devices, each of said secondary party CPE devices placed at a different geographic location and having a corresponding communication address, comprising:

- providing an AIN release one service node in electrical communication with said calling party CPE device and said plurality of secondary party CPE devices, said SSP having Automatic Call Distribution architecture;
- routing said communication signals from said calling party CPE device to said AIN service node;
- identifying said called number as that of said secondary party; and
- performing selected routing functions in a predetermined sequence in an attempt to locate said secondary party at one of said communication addresses, and instruct said service node how to direct said communication signals.

* * * * *